United States Patent Office 2,733,927
Patented Feb. 7, 1956

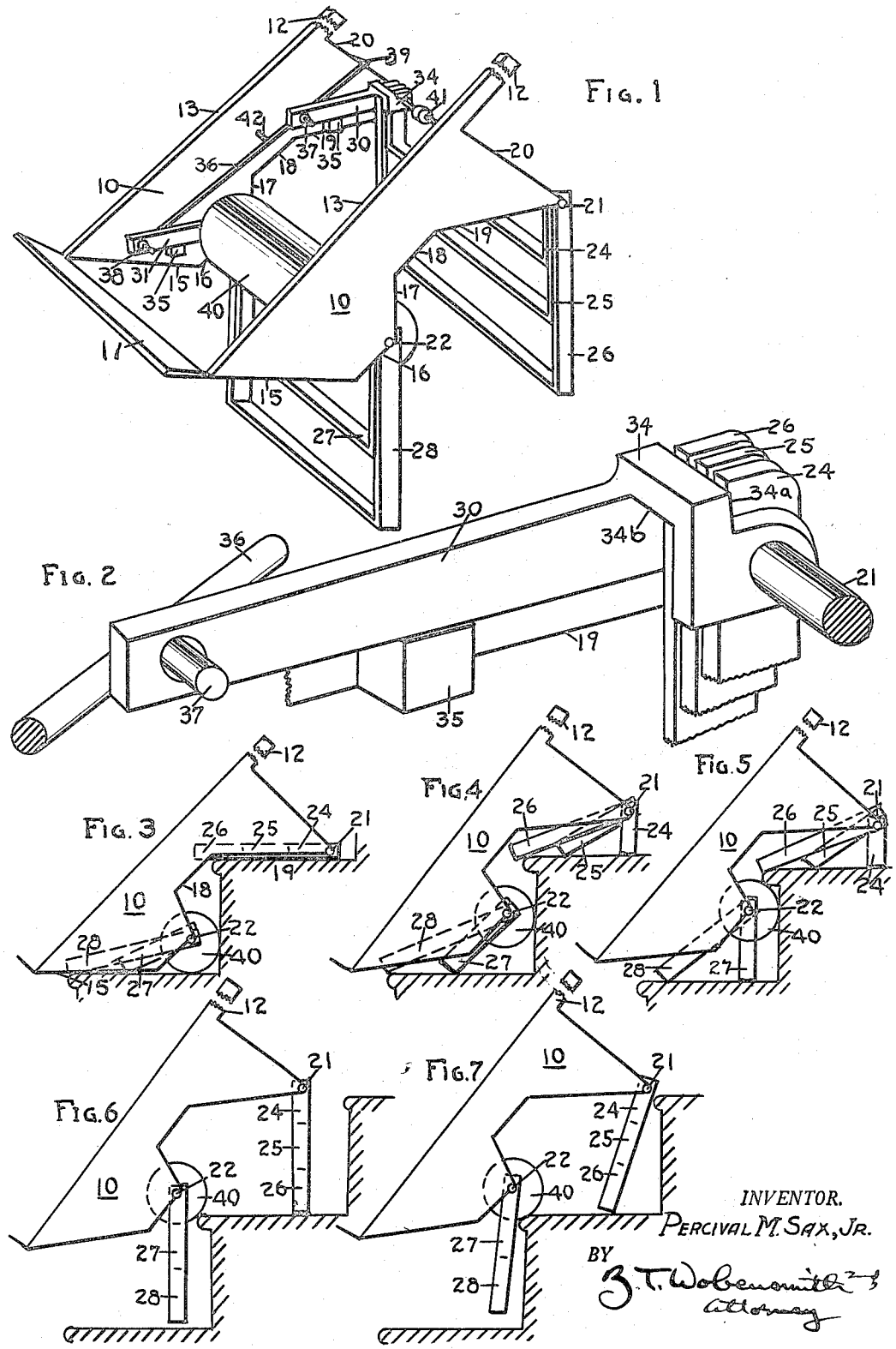

2,733,927

HAND TRUCKS FOR CLIMBING STAIRS

Percival M. Sax, Jr., Elkins Park, Pa.

Application October 20, 1953, Serial No. 387,226

8 Claims. (Cl. 280—5.32)

This invention relates to hand trucks and more particularly to a hand truck especially suited to the ascent and descent of steps.

It is the principal object of the present invention to provide an improved truck which is particularly suited to the ascent of stairs or steps of a building and which may also be used on level or slightly inclined surfaces.

It is a further object of the present invention to provide a hand truck suited to the lifting of heavy cumbersome objects such as oil burner tanks for domestic installations up stairs by relatively simple manipulation.

It is a further object of the present invention to provide a hand truck that permits the stable positioning thereof on any step of a flight of stairs.

It is a further object of the present invention to provide a hand truck that is sturdily and relatively economically constructed.

It is a further object of the present invention to provide a hand truck that can be effectively operated by relatively unskilled labor.

Other objects and advantageous features of the present invention will be apparent from the specification and claims.

The nature and characteristic features of the invention will be more readily understood from the following description taken in connection with the accompanying drawings forming part hereof, in which:

Figure 1 is a perspective view showing a preferred embodiment of the present invention;

Fig. 2 is an enlarged perspective view of a portion of the invention; and

Figs. 3 to 7, inclusive, are side elevational views showing the hand truck in progressive steps of operation in climbing stairs.

It should, of course, be understood that the description and drawings herein are illustrative merely, and that various modifications and changes may be made in the structure disclosed without departing from the spirit of the invention.

Referring now more particularly to the drawings, in accordance with the present invention, a pair of spaced parallel side rails or frame plates 10 is provided preferably of structural metal such as steel or the like. The frame plates 10 are connected at one pair of corresponding ends, which may be taken as the front ends, and at their uppermost marginal edges 13 by an inclined or angularly disposed cross bar 11, and at their opposite or rearwardly disposed ends have elongated extensions 12 which serve as handles as hereinafter explained.

The side rails or frame plates 10 have forwardly facing inclined marginal edge portions 15, disposed at angles such that in certain inclined positions of the truck they can bear upon the treads of the stairs. The edge portions 15 have rearwardly extending downwardly facing edge portions 16 which are disposed substantially parallel to the upper edges 13. From the edge portions 16, upwardly disposed rearwardly facing edge portions 17 extend to downwardly facing edge portions 18 disposed substantially parallel to the edges 13. From the edge portions 18, forwardly facing inclined marginal edge portions 19 extend, disposed at angles so that in certain inclined positions of the truck they can bear upon the treads of the stairs. From the edge portions 19, rearwardly facing upwardly extending edge portions 20 extend to the extensions 12. It will be noted that the disposition of the marginal edges 17, 18 and 19 is such as to provide a cut-out for clearance of the tread of the stairs.

A pair of axles 21 and 22 is provided preferably rigidly secured to and extending between the frame plates 10. The axle 21 is preferably positioned on the edges 19 close to their lower extremities and the axle 22 is preferably secured on the edges 16 a short distance from the edges 17 for reasons to be explained.

The axle 21 has a plurality of rear legs of different heights pivotally mounted thereon. While any desired number of legs may be employed, for purposes of illustration and as ascertained from actual practice, three legs, 24, 25 and 26, have been found satisfactory. The legs 24, 25 and 26 may be of any preferred type but those of U-shape and made of structural metal bent to the desired shape have been found satisfactory.

The axle 22 has a plurality of front legs of different heights pivotally mounted thereon. While any desired number of front legs may be employed, for purposes of illustration and as ascertained from actual practice, two front legs 27 and 28, have been found suitable.

While the rear legs 24, 25 and 26, and the front legs 27 and 28, may be varied in height as desired it is preferable that the leg 26 have a height slightly in excess of the height of an average step riser or for special uses slightly in excess of the height of the step risers with which the truck is to be used. The leg 24 should preferably have a height of approximately one half that of the leg 26. The leg 25 may then have a height intermediate that of the legs 24 and 26.

The legs 27 and 28 may be of any desired height and the leg 28 may be of approximately the same height as the leg 26. The optimum relative heights of the legs is when the same movement up and down each time causes successive legs to fall into place.

In order to limit the free swinging movement of the legs 24, 25 and 26 with respect to the axle 21 and of the legs 27 and 28 with respect to the axle 22, and so that these legs are restrained from swinging rearwardly beyond a predetermined vertical position with the frame plates in inclined position as shown in Fig. 1, stop levers 30 and 31 are provided pivotally mounted respectively on the axles 21 and 22.

The stop levers 30 and 31 are similar in construction and as shown in Fig. 2 each has a stop bar 34 with stop face 34a for engagement by the portions of the legs above the axles 21 and 22 and thus limit the movement of the legs in a counterclockwise direction as seen in Fig. 2. The stop bar 34 also has a stop face 34b for engagement by the legs to limit the movement of the legs in a clockwise direction as seen in Fig. 2. In order to limit the movement of the stop levers 30 and 31 in the direction which would permit the legs to move beyond their vertical limit positions and bring about a tendency of the truck to descend, stop blocks 35 are secured on the appropriate frame plate 10.

Provision is also made for positively retracting the legs, by movement of the stop levers 30 and 31, and for this purpose a rod 36 is employed having pins 37 and 38 thereon which pivotally engage the levers 30 and 31. The rod 36 has a hooked terminal and 39 for engagement around the edge portion 20 of a frame plate 10 when the legs are to be permitted to swing to a vertical position, and an intermediate pin 42 which when hooked behind an edge 20 of a plate 10 maintains the legs in a retracted position when they are not in use for ascending steps or when leg 26 is acting as a support to hold the truck in normal position.

An elongated roller 40 is provided preferably rotatably mounted on the axle 22. It is preferable that the diameter of the roller 40 and the position of the axle 22 be correlated so that the roller 40 and the edge 15, if extended, would be in tangential relation, for facilitating operation of the truck.

If desired, a pair of small spaced rollers 41 may be mounted on the axle 21 to facilitate the movement of the truck.

The mode of use will now be set forth. The article to be carried and moved up steps such as a tank or boiler or the like, is positioned on the hand truck of the present invention in any desired manner so that it rests on the marginal edges 13 and engages the cross bar 11. The legs 24, 25, 26, 27 and 28 are preferably all in retracted position. The operator grasps the handle extensions 12 and moves the truck supported by the roller 40 toward the steps to be ascended.

The hand truck is advanced to the first of the steps with the handle extensions 12 facing towards the steps until the roller 40 makes contact with the riser of the first step with the edges 15 extending over the lowermost horizontal surface, be it tread or lower floor and the edges 19 extending over the tread next above. (See Fig. 3.) The rollers 41 facilitate the positioning of the edges 19.

The operator releases the rod 36 to permit the legs 24, 25, 26, 27 and 28 to swing freely, and then lifts the handle extensions 12 to permit the leg 24 to move to a downwardly disposed and supporting position (see Fig. 4), maintaining the roller in a position near to or in contact with the riser.

The operator then lowers the handle extensions 12, the leg 24 serving as a fulcrum, to permit the leg 27 to move to a downwardly disposed and supporting position. (See Fig. 5.)

Upon repeated rocking in this manner by the handle extensions 12, legs 26 and 28 are successively brought to supporting position (see Fig. 6) and in this position the roller 40 engages the nose of the tread and the truck advances with the roller 40 rolling on the tread. As the truck is thus advanced (see Fig. 7) the legs 24, 25, 26, 27 and 28 are moved to retracted position as shown in Fig. 3 and the operations are repeated to advance the roller 40 onto the next step above. The truck is in stable equilibrium in the position shown in Fig. 3 and need not be held by the operator but may be stopped on any selected tread after any or all of the legs 24, 25, 26, 27 and 28 are in their downward positions so long as the handle extensions 12 are held or steadied by the operator.

If it is desired to retract the legs 24, 25, 26, 27 and 28, when they are not in use for the ascent of steps, this may be readily effected by movement of the rod 36 rearward until the pin 42 is hooked behind the edge 20 of a plate 10.

I claim:

1. A hand truck for climbing steps comprising a frame having handle portions extending therefrom, axles carried by said frame, at longitudinally spaced locations, a rotatable frame supporting member mounted on one of said axles, a group of frame supporting legs of different heights pivotally mounted on one of said axles for successive engagement with one of the steps, a second group of frame supporting legs of different heights pivotally mounted on another of said axles for successive engagement with another of the steps, one of said axles being disposed rearwardly of said rotatable member, and stop members for limiting the movement of said legs to positions inclined with respect to said frame.

2. A hand truck as defined in claim 1 having members for retracting said legs.

3. A hand truck as defined in claim 1 in which the legs are of U-shape.

4. A hand truck as defined in claim 1 in which the legs of each group are in nesting arrangements.

5. A hand truck for climbing steps comprising a frame having a pair of spaced frame plates with handle members extending therefrom, a pair of longitudinally spaced axles secured to said plates, a rotatable supporting member for said frame plates mounted on one of said axles, one of said axles being disposed rearwardly of said rotatable member, a plurality of frame supporting legs of different heights pivotally mounted on one of said axles and successively movable to supporting positions beneath said frame plates in engagement with one of the steps, a second plurality of frame supporting legs of different heights pivotally mounted on another of said axles and successively movable to supporting positions beneath said frame plates in engagement with another of the steps, and stop members for limiting the movement of said legs in a predetermined direction.

6. A hand truck for climbing steps comprising a frame having a pair of spaced longitudinally disposed frame plates with handle members extending longitudinally therefrom, a pair of transversely disposed spaced axles secured to said plates, a rotatable supporting member for said frame plates mounted on one of said axles, one of said axles being disposed rearwardly of said rotatable member, a plurality of frame supporting legs of different heights pivotally mounted on one of said axles and successively movable to supporting positions beneath said frame plates in engagement with one of the steps, a second plurality of frame supporting legs of different heights pivotally mounted on another of said axles and successively movable to supporting positions beneath said frame plates in engagement with another of the steps, stop members for limiting the movement of said legs in a predetermined direction, and members engageable with said legs for retracting said legs.

7. A hand truck as defined in claim 6 in which the legs are of U-shape.

8. A hand truck as defined in claim 6 in which the legs of each group are in nesting arrangements.

References Cited in the file of this patent

UNITED STATES PATENTS

| Number | Name | Date |
|---|---|---|
| 275,386 | Hughes | Apr. 10, 1883 |
| 671,222 | Moule | Apr. 2, 1901 |
| 876,753 | Wanee | Jan. 14, 1908 |
| 1,328,634 | Lea | Jan. 20, 1920 |
| 1,442,560 | Fahrney | Jan. 16, 1923 |
| 1,636,682 | Carlson | July 26, 1927 |
| 2,430,107 | Cronrath | Nov. 4, 1947 |
| 2,532,966 | Thomas | Dec. 5, 1950 |

FOREIGN PATENTS

| Number | Country | Date |
|---|---|---|
| 266,260 | Switzerland | Apr. 17, 1950 |